United States Patent
Carson

(10) Patent No.: US 8,761,014 B1
(45) Date of Patent: Jun. 24, 2014

(54) AUTHENTICATING A DATA TRANSMISSION BY VARYING A RATE THEREOF

(71) Applicant: Doug Carson & Associates, Inc., Cushing, OK (US)

(72) Inventor: Douglas M. Carson, Cushing, OK (US)

(73) Assignee: Doug Carson & Associates, Inc., Cushing, OK (US)

( * ) Notice: Subject to any disclaimer, the term of this patent is extended or adjusted under 35 U.S.C. 154(b) by 0 days.

(21) Appl. No.: 13/663,197

(22) Filed: Oct. 29, 2012

Related U.S. Application Data

(63) Continuation of application No. 11/699,605, filed on Jan. 30, 2007, now Pat. No. 8,300,524.

(60) Provisional application No. 60/763,403, filed on Jan. 30, 2006.

(51) Int. Cl.
*H04L 12/26* (2006.01)

(52) U.S. Cl.
USPC .......................................... 370/234; 370/253

(58) Field of Classification Search
USPC ........................... 370/230–234, 252, 253, 255
See application file for complete search history.

(56) References Cited

U.S. PATENT DOCUMENTS

| | | | |
|---|---|---|---|
| 5,661,800 A | 8/1997 | Nakashima et al. | |
| 5,787,171 A | 7/1998 | Kubota et al. | |
| 5,896,374 A | 4/1999 | Okumura et al. | |
| 5,953,652 A | 9/1999 | Amin et al. | |
| 6,226,290 B1 | 5/2001 | Salett et al. | |
| 6,334,121 B1 | 12/2001 | Primeaux et al. | |
| 6,377,548 B1 | 4/2002 | Chua | |
| 6,477,124 B2 | 11/2002 | Carson | |
| 6,999,417 B1 | 2/2006 | Graham et al. | |
| 7,102,973 B1 | 9/2006 | Carson | |
| 7,133,460 B2 | 11/2006 | Bae et al. | |
| 7,151,743 B2 | 12/2006 | Wahl et al. | |

(Continued)

FOREIGN PATENT DOCUMENTS

WO 03/054878 A1 7/2003

OTHER PUBLICATIONS

Wang, et al., "Anomalous Payload-Based Network Intrusion Detection," 2004, pp. 203-222, Springer-Verlag Berlin Heidelberg.

(Continued)

*Primary Examiner* — Hoon J Chung
(74) *Attorney, Agent, or Firm* — Hall Estill Attorneys at Law

(57) ABSTRACT

An apparatus and method for authenticating a data transmission across a network. Variations in data rate of data received across the network are detected, and the received data are authenticated when the variations conform to a preselected variable data rate profile. Preferably, an average data rate is first determined, and the data rates of individual data rates of blocks of the received data are compared to the average data rate. Some of the data rates are preferably faster than a selected threshold. Different portions of the received data preferably take different, parallel paths through the network from a transmitter to a receiver. Preferably, the received data are transmitted via packets. The data rate is preferably varied by using different densities of data packets, or by selectively delaying selected packets. Data authentication preferably results in grant of user access to the received data.

29 Claims, 5 Drawing Sheets

(56) References Cited

U.S. PATENT DOCUMENTS

| | | | |
|---|---|---|---|
| 7,349,407 B1* | 3/2008 | Takamatsuya et al. | 370/395.5 |
| 7,574,594 B2 | 8/2009 | Winter | |
| 2001/0049791 A1* | 12/2001 | Gascher | 713/185 |
| 2003/0046388 A1 | 3/2003 | Milliken | |
| 2003/0152101 A1 | 8/2003 | Feng | |
| 2004/0076173 A1 | 4/2004 | Marchetto | |
| 2005/0204131 A1 | 9/2005 | Kovarik | |
| 2006/0198311 A1 | 9/2006 | Molen et al. | |

OTHER PUBLICATIONS

Jacoby, et al., "Battery-Based Intrusion Detection," Apr. 12, 2005, Virginia Polytechnic Institute and State University.

Glossner, et al., "Towards a Very High Bandwidth Wireless Battery Powered Device," 2001, p. 3-9, IEEE.

* cited by examiner

PACKET FORMAT A

| 1024 BYTES | OVERHEAD | 1024 BYTES | OVERHEAD | 1024 BYTES | OVERHEAD |

3072 BYTES

PACKET FORMAT B

| 2048 BYTES | OVERHEAD | 2048 BYTES | OVERHEAD |

4096 BYTES

PACKET FORMAT C

| 1024 BYTES | OVERHEAD | GAP | 1024 BYTES | OVERHEAD | GAP |

2048 BYTES

FIG. 4

AUTHENTICATING A DATA TRANSMISSION BY VARYING A RATE THEREOF

RELATED APPLICATIONS

The present application is a continuation of U.S. patent application Ser. No. 11/699,605 filed on Jan. 30, 2007 which will issue as U.S. Pat. No. 8,300,524 on Oct. 30, 2012 which makes a claim of domestic priority to U.S. Provisional Patent Application No. 60/763,403 filed Jan. 30, 2006.

FIELD OF THE INVENTION

The present invention relates generally to the field of data transmission systems and more particularly, but without limitation, to a method and apparatus for authenticating a data transmission across a network by varying the rate of said transmission.

BACKGROUND

Digital data are often transmitted across networks from a transmitter (e.g., server) to a receiver (e.g., client). Such data transmission operations can take a wide variety of forms, such as the requesting of a user data file from a remote mass storage location, the requesting of access to an Internet webpage, the downloading of application software for installation onto the client system, etc. Such transmissions can take place across a local area network (LAN), a wireless network, a wide-area network (WAN), across the Internet, or a combination of the above.

It is often desirable to authenticate such data transmissions from either the sending or receiving side. For example, the transmitter may wish to restrict access to only authorized individuals, or may wish to ensure that the transmitted content cannot be subsequently re-transmitted by the receiver to a third party. Similarly, the receiver may wish to ensure that the requested data are in fact authentic and not from an unauthorized source.

SUMMARY OF THE INVENTION

Preferred embodiments of the present invention are generally directed to an apparatus and method for authenticating a data transmission across a network by selectively varying the data rate of the data.

In accordance with preferred embodiments, the method preferably comprises detecting variations in a data rate of data received across a network, and authenticating the received data when said variations conform to a preselected variable data rate profile.

Preferably, an average data rate is first determined, and then the data rates of individual data rates of blocks of the received data are compared to the average data rate. Some of the data rates are preferably faster than a selected threshold. Different portions of the received data preferably take different, parallel paths through the network from a transmitter to a receiver. Preferably, the received data are transmitted via packets.

In some embodiments, the data are transmitted at the variable rate by selectively arranging the data into packets with respectively different data densities. Alternatively, the data are transmitted by the variable data rate by delaying the transmission of selected packets of said data. Test data are preferably initially sent to determine an average data rate, and the variations of the detecting step are evaluated in relation to the average data rate.

The authenticating step preferably comprises granting access to the received data to a user when the received data conform to the preselected variable data rate profile. In some preferred embodiments, the authenticating step comprises operation of a receiver to request a key from a transmitter when the received data conform to the preselected variable data rate profile, transmitting the key to the receiver, and using the key to grant user access to the received data.

In accordance with other preferred embodiments, an apparatus is provided to carry out the foregoing method steps.

In this way, the data can be authenticated across any number of different types of networks irrespective of the native capabilities or operational conditions at the time of the transmission, as the variations are preferably evaluated in a relative sense.

BRIEF DESCRIPTION OF DRAWINGS

FIG. 4 provides alternative packet formats that can be utilized in accordance with preferred embodiments to obtain a variable data rate.

DETAILED DESCRIPTION

Figure 1:
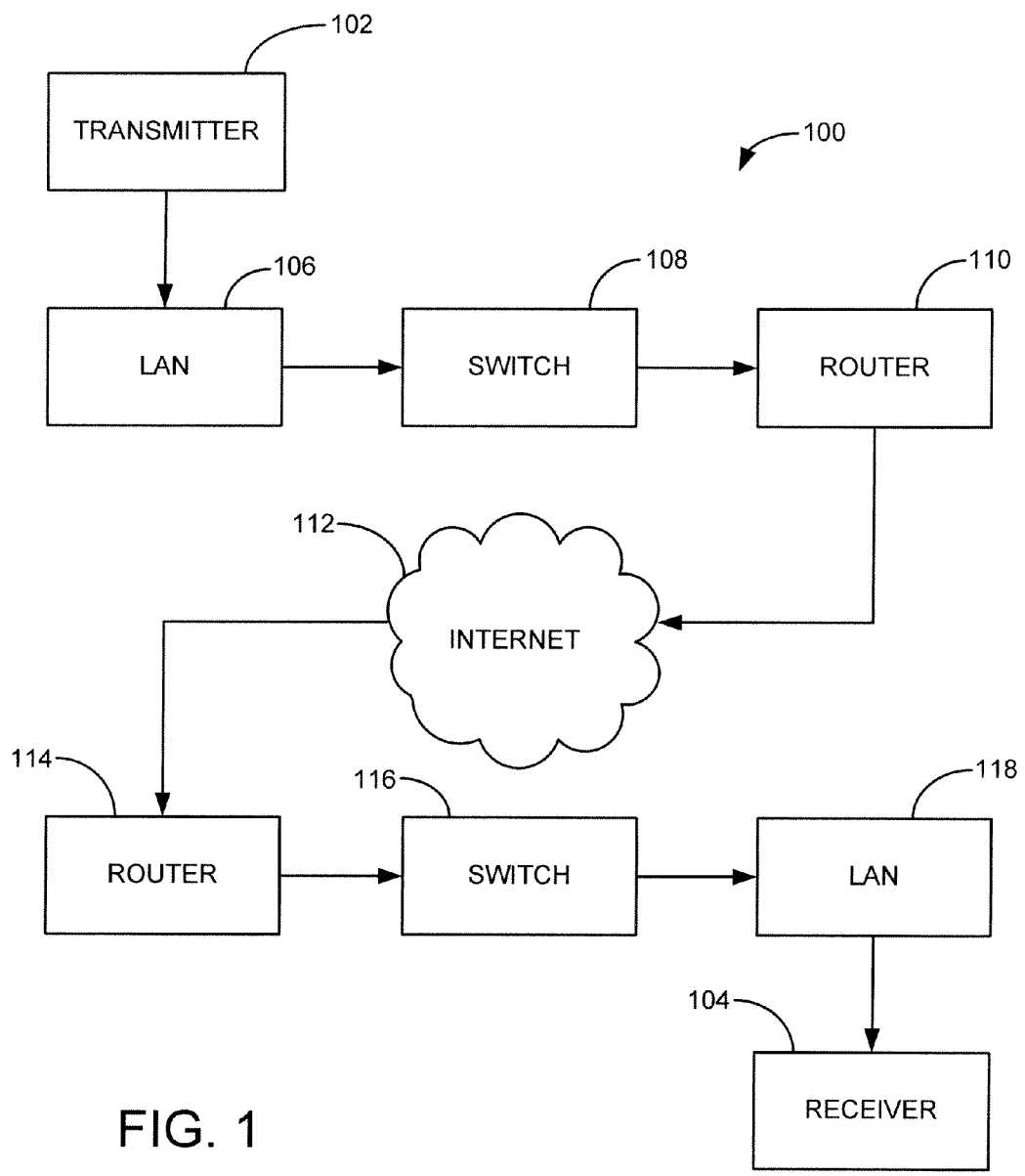
FIG. 1 provides a functional block representation of a network across which data are transmitted from a transmitter to a receiver in accordance with preferred embodiments of the present invention.

FIG. 1 provides a simplified block diagram of an exemplary network 100 preferably characterized as an Internet connection from a transmitter block 102 to a receiver block 104. For purposes of discussion, it will be contemplated that the transmitter 102 comprises a remote file server or similar, and the receiver 104 comprises a local PC or similar. Other network configurations can readily be used, however.

Data, such as a downloaded application software routine, are generally passed from the transmitter 102 to the receiver 104 via a path that may include a server-side local area network (LAN) 106, a switching module 108, and a router 110. These elements cooperate to direct the requested data to the Internet 112 for routing toward the receiver 104. The Internet 112 generally comprises a network of networks, and so within the Internet the data will likely pass to additional routers and one or more backbones to reach a local router 114, such as associated with the receiver's Internet service provider.

The data may be forwarded from the local router 114 to a switching module 116, and from there to a LAN 118 (or other structure) to the receiver PC 104. As those skilled in the art will appreciate, the foregoing example can take myriad forms and so is merely provided for purposes of a simple illustration, and is not limiting.

Figure 2:
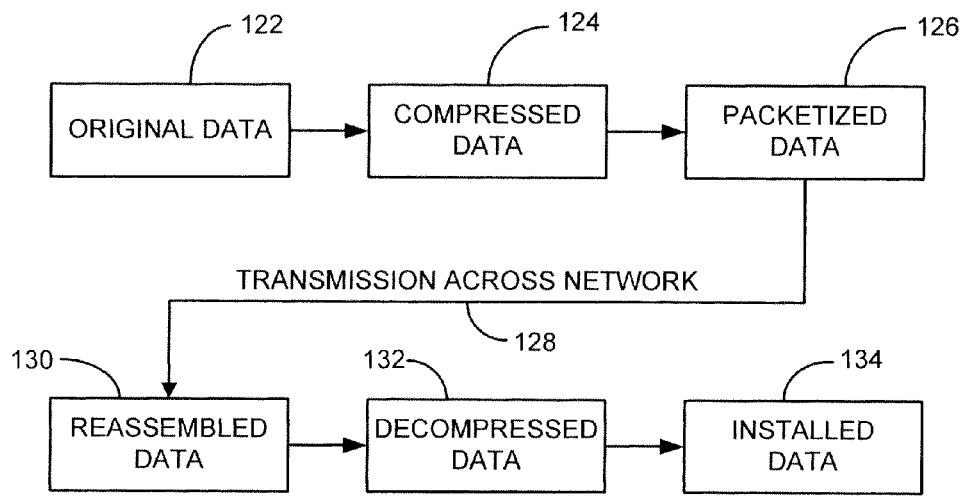
FIG. 2 shows an exemplary data transformation flow preferably carried out by the system of FIG. 1.

At this point it will be appreciated that depending on the characteristics and nature of the network, including the various layers and protocols employed therein, the transmitted data will generally be transformed in a number of ways to reach the receiver 104. As illustrated in FIG. 2, the original data resident in or by the transmitter 102 is shown at block 122. For efficiency, this data may be compressed or otherwise encoded, block 124, and further broken down into a number of packets, block 126, suitable for receipt and handling by the network. For clarity, the term "packet" as used herein will be understood to be applied broadly as individual portions of a larger data set with sufficient addressing or other characteristics to facilitate reconstruction of the original data set.

The data packets are transmitted across the network at 128 in accordance with the characteristics and existing loading requirements of the network. While a single path may be taken by all of the packets, it is contemplated that it will be more likely that some packets may take one path while other packets take another path. Thus, the order in which the packets are transmitted at step 126 may not in fact be the same order in which the packets are received at reassembly step 130.

The data are shown to be decompressed (or otherwise unencoded) at step 132 and installed onto the receiver system 104 at step 134. This latter step will depend on the nature of the received data; for example, simple text or drawing type content may simply be displayed by an application resident at the receiver; on the other hand, an executable application may launch an installation wizard which configures the receiver to now have a new application or other capability as a result of the download operation.

Further discussion of individual blocks of data sent across the network will be discussed shortly, but at this point it will be noted that under normal circumstances, the rate at which the packets reach the receiver 104 in FIG. 1 will largely be a function of the then-existing operational characteristics of the network. It can be generally seen that there will be some average network transmission time associated with the transversal of each packet of the original data to the receiver. This will vary widely due to a number of factors; for example, the transmission time to download a given amount of user data (and hence, a corresponding number of packets) for a dial up Internet or IDSN connection may be substantially less than if the receiver uses a cable modem or T1 connection. Also, delays or reroutings of individual packets within the Internet 112 may result in some packets having to be resent or redirected which can add variation to this rate.

Nevertheless, as a general rule, the Internet as well as other networks generally are provided with sufficient intelligence to provide load balancing and effective routing so that at a given time, the transmission of n packets will provide a generally quantifiable average transmission time. This is noted by the dashed line in FIG. 3, which is a simplified graphical illustration of the elapsed transmission time for a number of the packets 126 for a given data set. For clarity, reference to "elapsed transmission time" generally means the elapsed time from the release of a particular packet from the transmitter 102 (e.g., at block 126) to receipt of that packet by the receiver 104 (e.g., at block 130).

Figure 3:
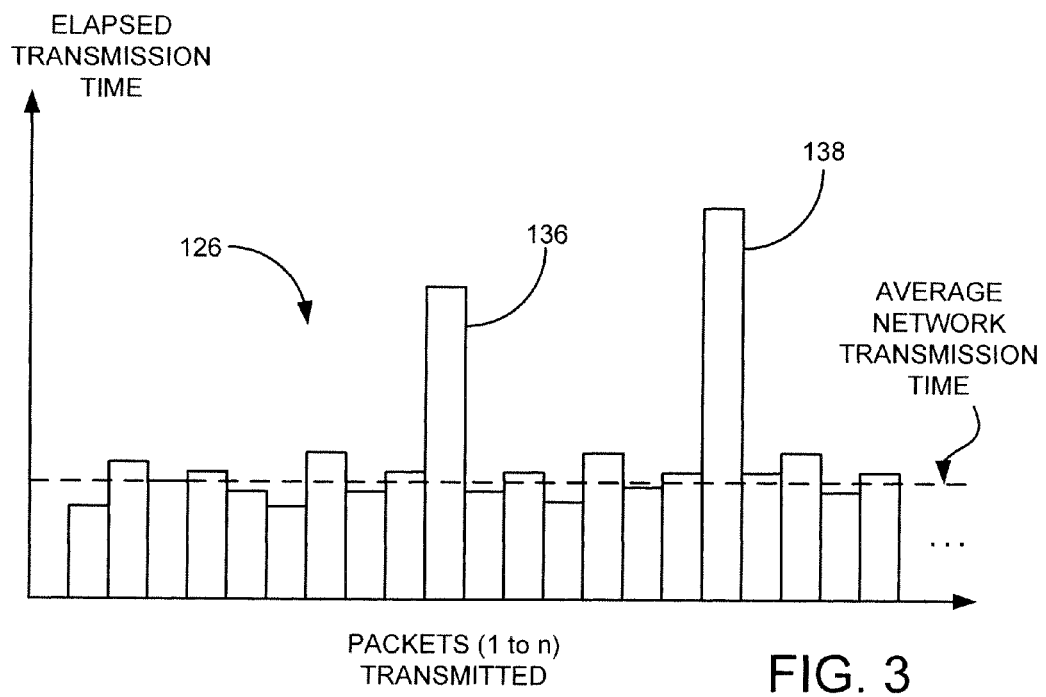
FIG. 3 graphically illustrates an exemplary variable data rate for data transmitted across the network of FIG. 1.

FIG. 3 further shows two exemplary packets at 136 and 138 which do not have elapsed transmission times that fall within the expected, or "normal" transmission time variation of the remaining packets 126. These variations are purposefully imparted to the packets 136, 138, and preferably serve to allow the entire data stream to be authenticated prior to or during the installation step 134 (FIG. 2).

The amount and type of variation will preferably be induced in accordance with a desired profile, and so FIG. 3 is merely provided to generally illustrate an overall operating principle of the preferred embodiments presented herein. At this point, however, it can readily be seen that absent a network-based cause for the delays, packets 136 and 138 have a sufficiently pronounced variation as compared to the average time that such can be readily detected by the receiver 104.

One preferred approach to inducing variations such as shown at 136, 138 is to utilize different sized packets, as depicted in FIG. 4. More specifically, while the network may not make it possible to actually send packets of different byte lengths, it is readily possible to significantly vary the amount of actual original (user) data in each packet. Thus, for example a first packet A in the accompanying FIG. 4 includes 3072 bytes of user data, a second packet B includes 4096 bytes of user data, and a third packet C includes 2048 bytes of user data. For the "reduced capacity" formats, overhead or "filler" type bytes are added. This may include "markers" or other information that identifies those particular packets as constituting adjusted packets.

An advantage of this approach is that detectable variations in the transmitted data rate can be readily observed by the receiver 104. This can be adjudged in any number of ways, such as X amount of user data received during time interval T1 and Y amount of user data received during time interval T2 (with X<<Y or vice versa).

In this case, the "packets" 136 and 138 of FIG. 3 do not necessarily directly correspond to individual packets (or other blocks) as viewed by the network 112, but rather to times during which the overall data transmission rate is significantly reduced (due to the receipt of one or multiple "reduced capacity" packets during the associated interval). While 136 and 138 depict reduced data rates, it will be readily apparent that significantly greater burst data rates can also be implemented as desired as part of the selected authentication profile.

An alternative embodiment utilizes "standard" sized and populated packets, but employs a selective metering of the data by the transmitter 102. More particularly, the transmitter selective delays the release of packets to the network in accordance with the desired variation profile to provide detectable delays at the reassembly step 130 of the receiver 104. Other variations and implementations will readily occur to the skilled artisan based on the present disclosure.

It will be noted that such variations in the transmission will generally not have much effect on the ability of the reassembly operation at 130 to reconstruct the received data. However, an additional capability at the receiver 104 (such as an initial program previously installed or downloaded at the start of the process) is preferably utilized that tracks the elapsed time of the received packets and then applies that during subsequent processing of the data.

Figure 5:
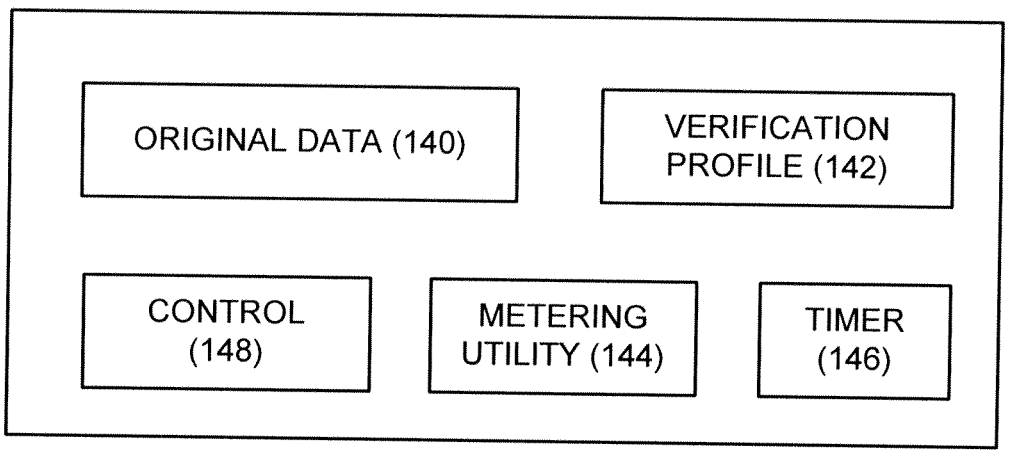
FIG. 5 illustrates a preferred configuration for the transmitter and the receiver of FIG. 1.
Figure 5:
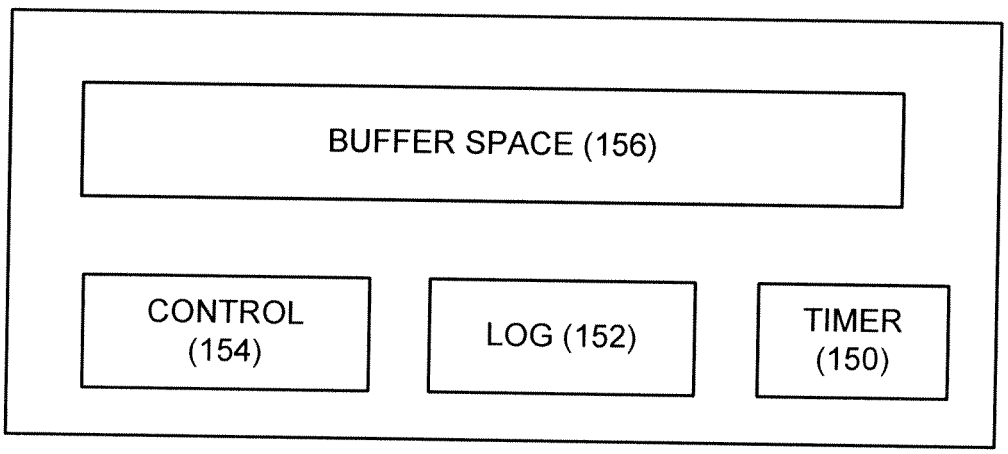

One such illustrative configuration for the transmitter 102 and receiver 104 is set forth by an application software configuration of FIG. 5. In this simplified, illustrative embodiment, the transmitter 102 is shown to include the original data at block 140 (stored locally or accessible by the transmitter), a verification profile at block 142, a metering utility block 144, a timer at 146 and a control block at 148. The receiver 104 is shown to preferably comprise a timer 150, a log block 152, and a control block 154. A buffer 156 is also shown to temporarily receive the transmitted data.

Generally, it is contemplated that an initialization step will occur first in which the respective control functions of blocks 148, 154 will communicate to establish the protocol for the data transmission operation. This will depend on the type of transfer, but for purposes of illustration the environment will be contemplated as that of a commercially available software application download from the transmitter 102 for installation onto the receiver 104. Thus, a number of steps will be taken, such as, for example, the user at the receiver PC accessing a web page of the transmitter server and entering the necessary information to request and initiate the download of the application.

The transmitter will thereafter proceed with the transfer in accordance generally with FIG. 2 and the profile of block 142. The profile of block 142 may be a standard profile associated with the application, or may be uniquely generated on an individual basis. The transmitter control block 148 will modulate the release of the data across the network 112 to the receiver in accordance with the profile.

Depending on the network configuration, it may be easier to increase rather than decrease the time of transmission for particular packets. The profile may be expressed as a binary code with, for example, 0 being portions (packets) sent in normal fashion and 1 being portions (packets) sent with attendant delays. The metering of the data will occur in conjunction with the operation of the metering block 144 and the timer 146.

The receiving controller block 154 will initiate the timer 150 and record elapsed transmission time data to the log 152 during the receipt of the data. Thereafter, once the data are reassembled (step 130) and, as necessary decoded (step 132), the log 152 is preferably referenced during the installation (step 134) to ensure that the rate of data receipt corresponds to that induced by the profile (block 142).

In this way, if the data was not received in accordance with the desired data transmission profile, the installation will be aborted or access will otherwise not be granted to the received data.

Built in intelligence can be utilized to reduce false alarms; for example, handshaking reporting between the transmitter and the receiver can continuously take place in order to better assess the average transmission time. It will be noted, however, that the profile is preferably expressed, and decoded, in a relative sense. That is, the verification operation by the receiver preferably examines the relative timing, not the absolute timing, of the various packets. Thus, it will not largely matter whether the receiver has access to the Internet via a dial up connection or a T3 connection; the network effects will largely be cancelled out.

Another preferred feature is the ability to send test or sample packets through the network. This can be used to calibrate the system to better assess the average and variations that may be experienced during the subsequent transmission operation.

Reporting can further be used by the receiver on the actual times received by each packet. In this way, the transmitter can send the profile information "at the end" to unlock the data at the receiver end. This data can further be stored at the transmitter site so that, periodically or upon subsequent activation steps, the profile is confirmed. This will help unauthorized copying of the received data to third parties by the receiver.

Figure 6:
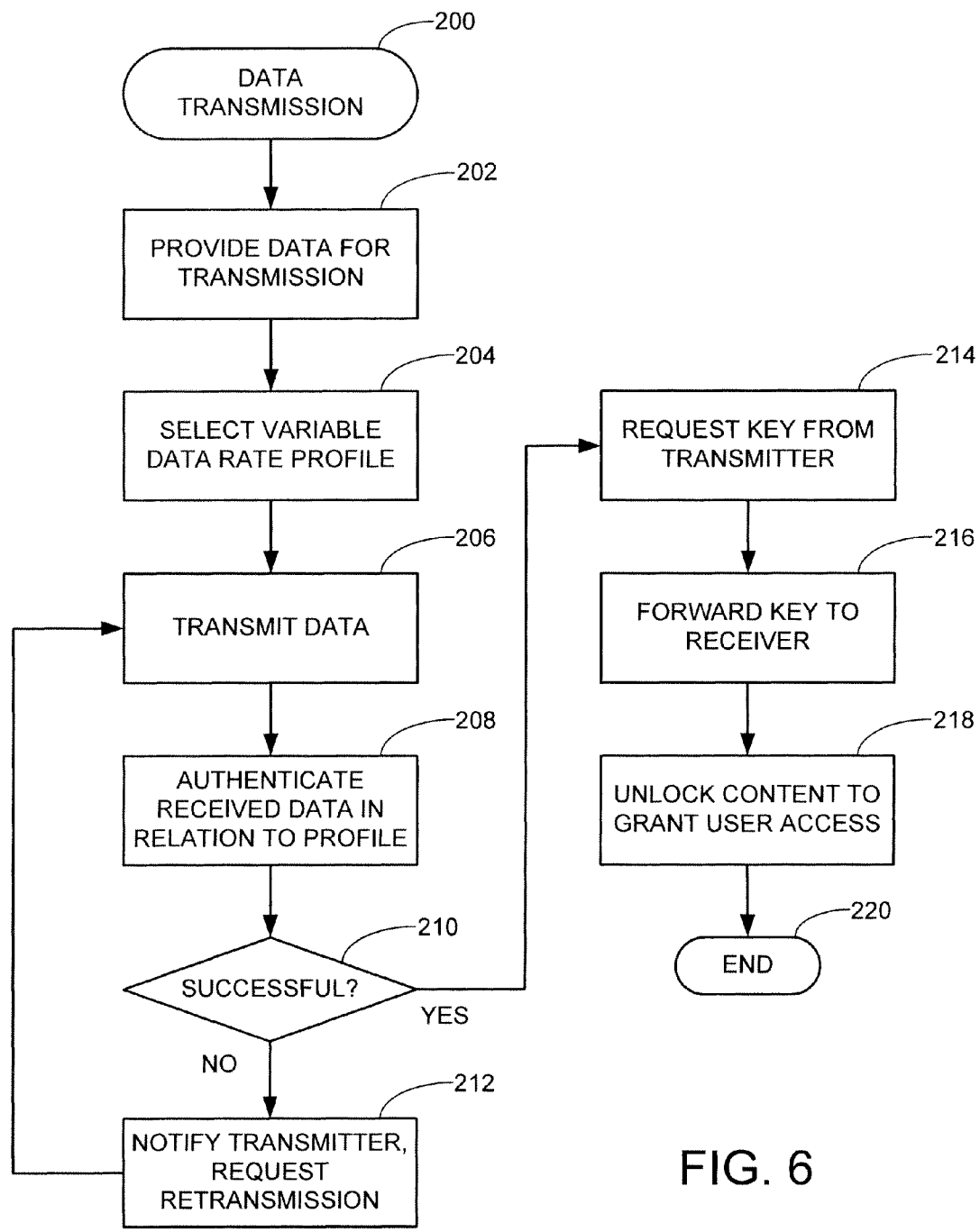
FIG. 6 sets forth a DATA TRANSMISSION routine generally illustrative of steps carried out in accordance with preferred embodiments of the present invention.

FIG. 6 provides a flow chart for a DATA TRANSMISSION routine 200, generally illustrative of steps preferably carried out by preferred embodiments to transmit data across a network, such as the network of FIG. 1. For purposes herein, the term "network" will be construed broadly as a data channel or path along which multiple transmitters and receivers can arbitrate connections, and will exclude, for example, the data channel of an individual data storage device or similar circuit.

The data to be transmitted is first provided at step 202, and an appropriate variable data rate profile is selected at step 204. At step 206, the data of step 202 are transmitted across the network, preferably across different, parallel paths from the transmitter to the receiver. During this step, the receiver preferably operates to detect (and preferably record) variations in data rates of the received data. As desired, test data (which may include a first portion of the data of step 202) are transmitted across the network to the receiver in order to assess an initial baseline for the connection characteristics and current network loading. The test data can also include a loading program executed by the receiver which configures the receiver to carry out the foregoing receiving and detection operations.

At step 208, the receiver proceeds to authenticate the data in relation to the preselected data rate profile. In some embodiments, the receiver preferably operates to identify data rates of individual blocks of data that fall outside a threshold level, and correlate these to blocks set forth in a list of such blocks that should have significantly altered data rates from the profile.

Decision step 210 indicates whether the authentication was successful; if not, a message is forwarded to the transmitter via step 212 and the data are retransmitted.

Preferably, upon authentication the receiver forwards a request for a key to the transmitter at step 214. The key can take any number of forms, such as an encryption based value that enables decoding of the received data. Under these circumstances, the key is preferably forwarded to the receiver at step 216, and the receiver uses the same to unlock the received data and grant access of the data to the user at step 218.

It is not required, though, that a specific request be made to obtain a key in this manner; no key can be required at all, or the key can be embedded in the transmitted data. The key can also be obtained as the receiver decodes the respective variable data rates in accordance with the preselected profile, either directly or as an address to locate the key within the received data. Regardless, as set forth by the flow of FIG. 6, upon successful authentication user access is granted, and the process ends at step 220.

In view of the foregoing discussion, it will now be generally recognized that preferred embodiments of the present invention can be generally characterized without limitation as an apparatus and method for verifying data transferred across a network. The rate at which the data are received is varied in relation to a selected profile, and the conformance of the received data to said profile facilitates authentication of the received data as authorized data.

The network preferably comprises a packet-switched type network wherein multiple possible transmission paths are available for the transmitted data and can comprise, for example, a local arbitrated loop, an intercontinental Internet path, or anything in between.

The data are preferably sent from a transmitter to a receiver across the network at a selected rate in accordance with a predetermined profile so that some portions of the transmitted data are received at an effective rate that is different than other portions of the transmitted data. An authentication operation preferably occurs at the receiver to verify that the received data are authentic in relation to these variations in effective transfer rates. The received data can take any number of forms including text, audio, video, executable files, drawings or other graphics files, etc. An executable routine (as generally depicted in FIG. 5) can be configured to direct the foregoing operations of the transmitter and receiver, as desired.

While the foregoing detailed discussion provides a disclosure of various preferred embodiments, any number of variations, changes and modifications will readily occur to the skilled artisan in view thereof. None of the foregoing variations or features will be viewed as essential or necessary to the claimed subject matter as set forth by the following claims.

What is claimed is:
1. A method comprising steps of:
receiving data at a receiver, the data transmitted by a transmitter to the receiver across a network, the data arranged as a plurality of successively received blocks;

detecting variations in a data rate of the received data by tracking an elapsed time interval to receive a selected block of the plurality of successively received blocks, determining an average time interval to receive each of the plurality of successively received blocks, and determining that the elapsed time interval for the selected block is greater than the average time interval by at least a selected threshold amount;

reassembling the received data; and subsequently authenticating the received data to verify the transmitter sent the received data responsive to determining that the elapsed time interval is greater than the average time interval by at least the selected threshold amount.

2. The method of claim 1, wherein the detecting step further comprises determining an average data rate in terms of the total number of bytes of the data received over a selected time interval, and then comparing individual data rates of blocks of the received data to the average data rate.

3. The method of claim 1, wherein the subsequently authenticating step comprises determining the elapsed time interval to receive the selected block conforms to a preselected variable data rate profile.

4. The method of claim 1, wherein different portions of the received data take different, parallel paths through the network from the transmitter to the receiver.

5. The method of claim 1, wherein the received data are transmitted via packets each having a header and a payload comprising multiple bytes of user data, and wherein the elapsed time interval is determined for a selected one of the packets.

6. The method of claim 1, further comprising a step of transmitting the data by the transmitter to the receiver at a variable data rate in accordance with a preselected variable data rate profile.

7. The method of claim 6, wherein the transmitter transmits the data at said variable data rate by selectively arranging the data into packets with respectively different data densities so that a first packet has a first total multiple number of bytes of the data and a second packet has a different total multiple number of bytes of the data.

8. The method of claim 6, wherein the transmitter transmits the data at said variable data rate by delaying the transmission of selected packets of said data.

9. The method of claim 1, further comprising a prior step of sending test data to the receiver to determine an average data rate, wherein the variations of the detecting step are evaluated in relation to the average data rate.

10. The method of claim 1, wherein the authenticating step comprises granting access to the received data to a user when the received data conform to a preselected variable data rate profile.

11. A method comprising:

generating a variable data rate profile which identifies variations in a data rate for data to be transmitted across a network;

arranging the data to be transmitted into a plurality of packets responsive to the variable data rate profile, wherein the transmitted data arranged into the plurality of packets comprises user data and filler data;

forming the plurality of packets so that different ones of the packets have different relative ratios of the user data and the filler data in relation to the variable data rate profile; and sequentially transmitting the plurality of packets from a transmitter to a receiver across the network, the transmitted plurality of packets having variations in the data rate thereof in relation to the variable data rate profile to facilitate authentication by the receiver of the transmitted plurality of packets, wherein different packets take different, parallel paths through the network from the transmitter to the receiver.

12. The method of claim 11, further comprising transmitting the variable data rate profile from the transmitter to the receiver for use by the receiver during said authentication by the receiver of the transmitted plurality of packets.

13. The method of claim 11, further comprising using the receiver to detect said variations in the data rate of the transmitted plurality of packets by tracking an elapsed time interval to receive a selected packet of the plurality of packets, wherein the elapsed time interval for the selected block is greater than an average time interval to receive each of the plurality of blocks by at least a selected threshold amount.

14. The method of claim 13, further comprising using the receiver to reassemble the received data and to subsequently authenticate the received data to verify the transmitter sent the received data responsive to the elapsed time interval.

15. The method of claim 11, further comprising sending test data from the transmitter to the receiver over the network prior to the subsequently transmitting step to determine an average data rate, wherein the subsequently transmitting step comprises transmitting the plurality of data packets responsive to the determined average data rate.

16. An apparatus comprising a receiver coupled to a transmitter through a network, the receiver configured to detect variations in a data rate of data sent through the network from the transmitter to the receiver by tracking an elapsed time interval to receive a selected block of a plurality of blocks of the received data, wherein the elapsed time interval indicates an elapsed time from receipt of the selected block of the plurality of blocks to receipt of another block of the plurality of blocks, determination that the elapsed time interval for the selected block is greater than an average time interval to receive each of the plurality of blocks by at least a selected threshold amount, wherein the receiver is further configured to reassemble the received data and authenticate the received data in relation to the determination that the elapsed time interval for the selected block is greater than the average time interval by at least the selected threshold amount, and wherein at least one block of the plurality of blocks includes filler data to reduce the data rate of the received data.

17. The apparatus of claim 16, wherein the receiver authenticates the received data responsive to the detected variations in the received data conform to a preselected variable data rate profile, wherein the authentication verifies the transmitter sent the received data.

18. The apparatus of claim 16, wherein different portions of the data take different, parallel paths through the network from the transmitter to the receiver.

19. The apparatus of claim 16, wherein the receiver determines an average data rate and compares individual data rates of blocks of the received data to the average data rate in order to detect said variations in the data rate of the received data.

20. The apparatus of claim 16, wherein the receiver grants access to the received data to a user when the received data conform to the preselected variable data rate profile.

21. The apparatus of claim 16, wherein the receiver is further configured to request a key from the transmitter when the received data conform to the preselected variable data rate profile, receive the key from the transmitter, and use the key to grant user access to the received data.

22. An apparatus comprising a transmitter coupled to a receiver across a network, the transmitter configured to arrange a set of data into a plurality of packets responsive to a variable data rate profile, and to sequentially transmit the plurality of packets across the network to the receiver, the data arranged as a plurality of successively received blocks, with variations in a transmitted data rate selected in relation to the variable data rate profile to facilitate authentication by the receiver of the transmitted plurality of packets responsive to determining that an elapsed time interval is greater than an average time interval by at least a selected threshold amount responsive to determining that the elapsed time interval is greater than the average time interval by at least the selected threshold amount, wherein detection of variations in a data rate of the received data is tracked by the elapsed time interval to receive a selected block of the plurality of successively received blocks, determination of the average time interval to receive each of the plurality of successively received blocks, and determination that the elapsed time interval for the selected block is greater than the average time interval by at least the selected threshold amount, and wherein at least one of the plurality of packets includes filler data in relation to the variable data rate profile.

23. The apparatus of claim 22, in which the transmitter is further configured to send test data across the network to the receiver to determine an average data rate, wherein the transmitter subsequently transmits the plurality of packets in relation to the determined average data rate.

24. The apparatus of claim 22, in which the transmitter is further configured to selectively delay a transmission of at least a selected one of the plurality of packets in relation to the variable data rate profile.

25. The apparatus of claim 22, in which the transmitter further transmits the variable data rate profile to the receiver to facilitate the authentication of the data by the receiver of the transmitted plurality of packets.

26. The apparatus of claim 22, in which the transmitter further transmits a key to the receiver across the network to facilitate a grant of access to user data in the plurality of packets.

27. A method comprising steps of:
transmitting data from a transmitter to a receiver across a network, the data arranged as a plurality of successively received blocks;
detecting variations in a data rate of the received data by tracking an elapsed time interval to receive a selected block of the plurality of successively received blocks and by determining an average time interval to receive each of the plurality of successively received blocks, and determining that the elapsed time interval for the selected block is greater than the average time interval by at least a selected threshold amount;
reassembling the received data; and
subsequently authenticating the received data to verify the transmitter sent the received data responsive to determining that the elapsed time interval is greater than the average time interval by at least the selected threshold amount, wherein the transmitter transmits the data at said variable data rate by delaying the transmission of at least one of the plurality of successively received blocks.

28. The method of claim 27, wherein different portions of the received data take different, parallel paths through the network from the transmitter to the receiver.

29. The method of claim 27, wherein the network comprises the Internet.

* * * * *